Dec. 1, 1964 T. D. READER 3,159,169

PULSE GENERATOR

Filed Sept. 4, 1962 2 Sheets-Sheet 1

INVENTOR

TREVOR D. READER

BY Griffin and Stokes

ATTORNEYS

Dec. 1, 1964 T. D. READER 3,159,169

PULSE GENERATOR

Filed Sept. 4, 1962 2 Sheets-Sheet 2

United States Patent Office 3,159,169
Patented Dec. 1, 1964

3,159,169
PULSE GENERATOR

Trevor Drake Reader, Wayne, Pa., assignor to Sperry Rand Corporation, New York, N.Y., a corporation of Delaware Filed Sept. 4, 1962, Ser. No. 221,044
19 Claims. (Cl. 137—81.5)

The present invention relates to pure fluid operated pulse generators. More particularly, the present invention relates to fluid pulse generators of the type having a stable state and an unstable state with means of producing output signals indicating the state of the pulse generator and further means for producing an output signal each time the pulse generator switches from one state to the other.

An object of the present invention is to provide a monostable fluid operated pulse generator having means for controlling the length of time during which it remains in its unstable state.

An object of the present invention is to provide a fluid operated pulse generator having a stable state and an unstable state, means for applying a fluid pulse to the pulse generator to cause it to switch from its stable to its unstable state, feedback means responsive to the output signal from the pulse generator when in its unstable state for causing the pulse generator to return to its stable state, and means for producing a first fluid output signal when the pulse generator is in its stable state and a second fluid output signal when the pulse generator is in its unstable state.

An object of the present invention is to provide a fluid operated pulse generator as described in the preceding paragraph and having means for producing a fluid output signal of predetermined duration each time it changes from one state to the other.

A further object of the invention is to provide a monostable pulse generator which produces output pulses of predetermined duration event though the duration of the input pulses applied thereto may vary considerably.

Still another object of the invention is to provide a pulse generator which produces output pulses in response to input pulses only if a predetermined time interval elapses between the times two succeeding input pulses are received. The pulse generator has a stable state and an unstable state each defined by a path of power stream flow. An input pulse causes the power stream to assume a path of flow corresponding to the unstable state. A portion of the power stream is fed back to deflect the power stream to its stable state of flow. Once a power stream has deflected the power stream away from its stable state of flow subsequent input pulses have no effect until the pulse generator has gone through a complete cycle and the power stream returned to its stable state of flow. Means are provided for controlling the amount of feedback fluid when the pulse generator is in its unstable state to thus control the duration of a cycle of the pulse generator.

Another object of the invention is to provide a substantially solid body having an interaction chamber, a power stream input channel terminating at an orifice in the interaction chamber, a control signal channel terminating at an orifice in the interaction chamber, a plurality of output chambers connected to the interaction chamber by a plurality of output channels, a feedback path for conveying fluid from one of said output chambers to a second control orifice in the interaction chamber, and means for withdrawing fluid from or adding fluid to said one output chamber. The interaction chamber is designed such that a power stream issuing from the power stream input channel has two stable paths of flow through the interaction chamber. A fluid control signal applied to the control signal input channel deflects the power stream to a stable state of flow wherein it flows into said one chamber. Power stream flow into this chamber causes the pressure therein to increase to a point where the feedback path causes sufficient fluid to issue from the second control orifice to deflect the power stream back to the other state of flow. By adding additional fluid to said one chamber the time during which the power stream flows into said one chamber is reduced. Conversely, the power stream continues to flow into said one chamber for a longer time if some of the power stream is removed from said one chamber. The additional output chambers may be provided as desired to indicate that the power stream is in one or the other stable state of flow or is changing from one state to the other.

Other objects of the invention and its mode of operation will become apparent upon consideration of the following description and the accompanying drawing in which.

Figure 1:
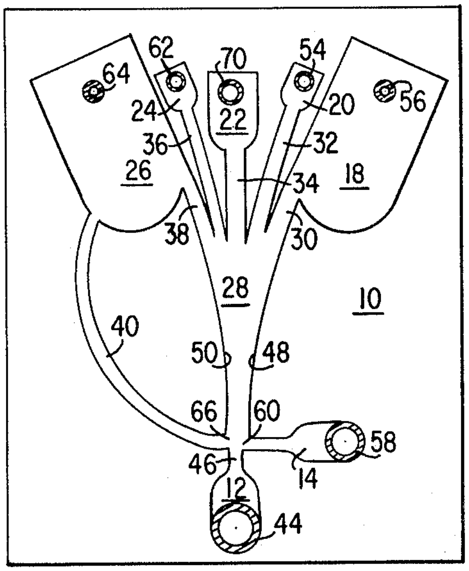
FIGURE 1 shows the channel and chamber configuration of a preferred embodiment of the invention.

The pulse generators subsequently described may be made of various materials and constructed in any one of several ways. FIGURE 2 is a side view of FIGURE 1 and illustrates one mode of construction. In general, a typical pulse generator comprises a substantially solid body having a configuration of channels and chambers therein for defining paths of fluid flow. The fluid may be air or another gas or water or another liquid. As shown in FIGURE 2, a substantially solid body 1 comprises three flat plates 1A, 1B and 1C. Plate 1C is flat on both sides and serves as a back plate. Plate 1B has the desired configuration of channels and chambers formed therein by any conventional method such as cutting, stamping, etching or molding. Plate 1A is also substantially flat so that when the three plates are assembled as shown the channels and chambers in plate 1B are fluid tight. The plates may be held together in a fluid-tight relationship by an adhesive material, screws, or other conventional means.

The plate 1A has holes drilled through it at predetermined positions. These holes are then threaded to receive pipes which apply fluid to or convey fluid from the channels in plate 1B. The plates may be made of a ceramic, plastic, metallic or other material and for the sake of clarity are shown in the drawing as being made of a clear plastic material. The above described construction is by way of illustration only since other modes of construction are equally suitable for use in making pure fluid pulse generators. For example, the two-plate construction described in U.S. Patent No. 3,030,979 may be employed.

Figure 2:
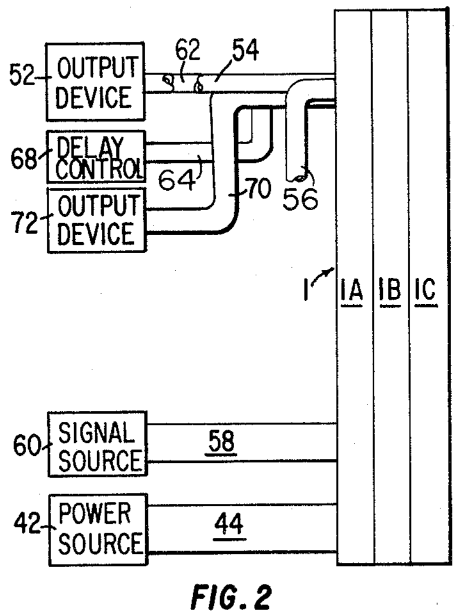
FIGURE 2 is a side view of FIGURE 1.

Turning now to FIGURE 1, a preferred embodiment of the invention comprises a pulse generator 10 having a power stream input channel 12, a control signal input channel 14, a plurality of chambers 18, 20, 22, 24 and 26 connected to an interaction chamber 28 by a plurality of fluid channels 30, 32, 34, 36 and 38, respectively, and a feedback channel 40.

A power source 42 (FIGURE 2) supplies a continuous stream of fluid over a pipe 44 to the power stream input channel 12. Source 42 may be a pump or compressor and preferably includes a conventional pressure regulator so that fluid is applied to channel 12 under a substantially constant pressure.

The fluid applied to channel 12 flows through an orifice 46 and since orifice 46 has a smaller cross-sectional area than channel 12 the velocity of the fluid increases so that the fluid enters chamber 28 as a high velocity power jet stream.

The right and left walls 48 and 50 are offset from the edges of orifices 46 so that the power jet stream locks onto wall 48 or wall 50 due to the boundary layer phenomenon described in U.S. Patent No. 3,001,698. For purposes of the subsequent description it is assumed that wall 48 is slightly closer than wall 50 to the edge of orifice 46 so that when a power jet initially begins to issue from the orifice it locks onto wall 48.

Boundary layer control of the power jet stream may be explained as follows. When the high velocity jet stream first begins to emerge from orifice 46 it begins to withdraw molecules of fluid from the regions between the jet stream and walls 48 and 50. Since wall 48 is closer than wall 50 to the jet stream the jet is more efficient in withdrawing molecules of fluid from the region adjacent wall 48 thus reducing the pressure between the jet and wall 48 to a value less than the pressure between the jet and wall 50. This tends to deflect the power jet closer to wall 48. As the jet moves closer to wall 48 it becomes more efficient in withdrawing molecules of fluid from the region adjacent this wall and less efficient in withdrawing molecules of fluid from the region adjacent wall 50. Thus, the jet is deflected even closer to wall 48. The effect is cumulative and in a very short time the power jet stream locks onto wall 48 so that it flows upward along this wall and through the channels 30 and 32 to the chambers 18 and 20. The pulse generator is considered to be in the reset state when this condition exists with the reset state being manifested by increased fluid pressure in chambers 18 and 20.

An output device 52 is connected by means of a pipe 54 to the chamber 20 to sense the variations in pressure in chamber 20 and thus determine the state of the pulse generator. The output device may, for example, be either a pure fluid or fluid-actuated data processing device. A pipe 56 provides an outlet from chamber 18 and is preferably connected to the fluid return side of power source 42.

The power jet stream remains locked onto wall 48 and the pulse generator remains in its reset state until a control signal is applied to external control signal input channel 14. Channel 14 is connected by means of a pipe 58 to an external signal source 60. The external signal source may be a conventional valve or other means for causing fluctuations in the pressure in the channel 14. The terms control signal, external control signal, external control signal input channel, and control signal input channel are used in the following description and claims in a limited sense and exclude feedback channels such as channel 40 and the signals produced in such channels.

When external signal source 60 applies a fluid signal to channel 14 the pressure in this channel increases and causes fluid to flow through the orifice 60 into chamber 28. As the fluid enters chamber 28 it flows into the boundary layer region along wall 48 thus tending to increase the pressure along this wall. As a result, the power stream breaks away from wall 48 and begins to swing toward the left wall 50 of the chamber. The fluid entering the chamber between the power jet stream and wall 48 increases the pressure in this region to a value somewhat greater than the pressure between the power jet stream and the wall 50. This forces the power jet stream to move closer to wall 50 and the closer the jet stream moves to this wall the more efficient it becomes in withdrawing molecules of fluid from the region adjacent the wall. Again, the action is cumulative and after a short time interval the power jet stream issuing from orifice 46 locks onto wall 50 and flows through channels 36 and 38 to chambers 24 and 26.

It should be noted that the flow of control fluid through orifice 60 need not be maintained until the power jet is locked onto wall 50. All that is necessary is that the control stream issuing from orifice 60 continue until the power jet stream has moved closer to wall 50 than wall 48. Once this movement has been accomplished the control signal in channel 14 may be terminated. Once the power jet stream has been moved closer to wall 50 than to wall 48 it becomes more efficient in withdrawing molecules of fluid from the region adjacent wall 50. This causes the power jet stream to move closer to wall 50 and through the cumulative action described above it eventually locks onto the wall.

While the power stream may be switched from wall 48 to wall 50 solely by dispersion of the boundary layer adjacent wall 48 as described above, the time required for the switching action may be materially reduced if the signal applied to channel 14 is of sufficient magnitude to cause a high velocity control jet stream to issue from orifice 60. In this case the switching action caused by dispersion of the boundary layer is aided by direct deflection of the power jet by the control jet. The control jet strikes the power jet and the momentum imparted thereto causes the power jet to change direction and flow closer to wall 50.

When the power jet stream begins to flow along wall 50 it divides between channels 36 and 38 and flows into channels 24 and 26 thus causing an increase in pressure in these chambers. This condition represents the set state of the pulse generator. Chamber 24 is connected by means of a pipe 62 to the output device 52 to provide the output device with an indication that the pulse generator is set.

Chamber 26 is connected by means of a feedback channel 40 to a control signal input orifice 66. Channel 40 and orifice 66 perform a function similar to that of channel 14 and orifice 60. However, when fluid issues from orifice 66 it increases the pressure in the boundary region between the power stream and wall 50 thus causing the power stream to break away from this wall and move closer to the wall 48. Once the power stream has been moved closer to wall 48 than wall 50 it locks onto the wall 48 in the manner described above.

The pulse generator remains in the set state with the power stream locked onto wall 50 for only a predetermined length of time after which the pulse generator is switched back to its reset state. This is accomplished as follows. When the pulse generator is first switched to its set state and the power stream flows along wall 50 a major portion of the fluid mass passes through channel 38 and enters chamber 26. As more fluid flows into chamber 26 the pressure therein increases thus causing an increase in the flow of fluid from the chamber 26 through the feedback channel 40 to the orifice 66. When the pressure in chamber 26 first begins to increase the amount of fluid issuing from orifice 66 is insufficient to diffuse the boundary layer along wall 50. However, as the pressure in chamber 26 increases the amount of fluid flowing through orifice 66 increases until the volume of fluid supplied to the boundary layer region is greater than the amount of fluid which can be withdrawn from the region by the action of the power stream. When this condition is reached the power stream breaks away from wall 50 and begins to switch toward the wall 48. When the power stream begins to break away from wall 50 fluid stops flowing in the chamber 26 and the pressure in the chamber decreases rapidly thus decreasing the amount of fluid flowing into the chamber 28 through orifice 66. However, by this time the power stream has moved closer to wall 48 than wall 50 so that it continues to move toward the right and lock onto wall 48 even though the control stream stops flowing through orifice 66.

From the above description it is obvious that the period of time during which the power stream is locked onto wall 50 is determined by the volume of fluid which can flow into chamber 26 without causing a predetermined rate of flow of fluid through the orifice 66 into chamber 28. Therefore, chamber 26 is connected by means of a pipe 64 to a delay control means 68. Delay control means 68 may be a pump or compressor or any other means for applying fluid to or removing fluid from the chamber 26 at a controlled rate. If fluid is applied to the chamber 26 through pipe 64 then the power stream remains locked onto wall 50 for a shorter time. In this case a smaller amount of power stream mass flowing into chamber 26 increases the rate of control stream flow through orifice 66 to the rate required for switching. On the other hand, if fluid is removed from chamber 26 through the pipe 64 then the power stream remains locked onto wall 50 for a longer period of time since a portion of the mass flow into the chamber is removed through the pipe 64 and it takes longer to build up the pressure in chamber 26. Since it takes longer to build up the pressure in chamber 26 it takes longer to create a volume of flow through orifice 66 sufficient to break the power stream away from the wall 50.

Channel 34 is connected to the chamber 22 which in turn connected by means of a pipe 70 to an output device 72. Output device 72 may or may not be the same as output device 52, depending upon the particular use of the pulse generator. This arrangement provides the output device with two pressure pulses each time the pulse generator goes through a complete cycle of operations. Assuming for example that the pulse generator is in its reset state with the power stream locked onto wall 48. As a control signal is applied to channel 14 the power stream breaks away from wall 48 and begins to swing in an arc toward wall 50. At approximately the midpoint of this arc the power stream is directed toward the channel 34. Flow of the power stream into channel 34 causes an increase in the pressure in chamber 22 and this signal is transmitted by means of pipe 70 to the output device 72 to indicate that the pulse generator has commenced a cycle of operation. The power stream continues to swing to the left and locks onto wall 50 to cause an increase in pressure in chamber 26 and thus produce a control signal at orifice 66 in the manner described above. The control signal issuing from orifice 66 causes the power stream to break away from wall 50 and swing back toward wall 48. At approximately the midpoint of this movement the power stream is again directed into channel 34 thus causing another pressure pulse to be transmitted to output device 72 with this pulse indicating that the pulse generator is completing the cycle of operation.

Each pulse produced in channel 34 is of a predetermined duration for a particular amplifier. The duration of each pulse is determined by several factors such as the width of channel 34, the width of the power jet stream, and the rate at which the power stream switches from one state to the other.

Figure 6:
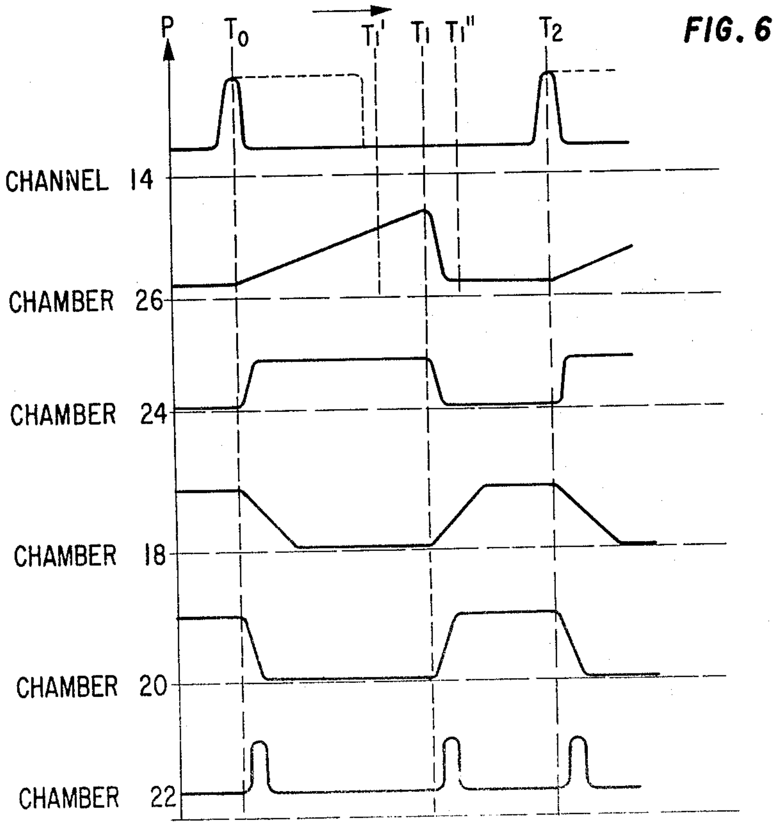
FIGURE 6 is a waveform diagram illustrating the operation of the invention.

FIGURE 6 is a waveform diagram illustrating the operation of the embodiment shown in FIGURE 1. The pulse generator is initially in its reset state with the power stream locked onto wall 48 and flowing through channels 30 and 32 into chambers 18 and 20. As shown in FIGURE 6 the pressures in chambers 18 and 20 are at some predetermined upper value which is determined by the size and velocity of the power jet stream and other factors such as the relative sizes of channels 30 and 32. Furthermore, the pressure in chamber 26 is at some value determined by the amount of fluid applied thereto by the delay control means 68. At time T0 a pressure pulse of relatively short duration is applied to channel 14. As shown by the dotted waveform this pressure pulse may be of longer duration without materially affecting the operation of the pulse generator.

When the pressure pulse is applied to channel 14 the power stream breaks away from wall 48 and begins to swing toward 50. As the power stream moves away from wall 48 less fluid flows into the channels 30 and 32 and the pressures in chambers 18 and 20 begin to decrease. Because of the relative sizes of these chambers the pressure in chamber 20 decreases more rapidly than the pressure in chamber 18.

As the power stream moves from wall 48 to wall 50 there is a short time interval during which the power stream flows into channel 34. This causes a short pressure pulse of predetermined duration to be applied to the chamber 22.

As the power stream continues its movement toward wall 50 more and more of the power stream begins to flow into the channels 36 and 38 with a smaller amount of the power stream flowing into channel 34. Thus, the pressure in chamber 22 decreases rapidly while the pressure in chambers 24 and 26 begin to increase. Because of the relative sizes of chambers 24 and 26 the pressure increases in chamber 24 much more rapidly than in chamber 26. This pressure signal may be transferred by way of the pipe 62 to the output device 52 to provide an output signal as long as the pulse generator is in its set state.

As the power stream flows through channel 38 into chamber 26 the pressure in the chamber 26 builds up and begins to cause fluid to issue from orifice 66. At time T1 the pressure in chamber 26 is such that the volume of fluid issuing from orifice 66 is sufficient to deflect the power stream away from the wall 50.

As the power stream moves away from wall 50 more of the power stream flows into the channel 34 and less into the channels 36 and 38. The pressures in chambers 24 and 26 decrease rapidly while the pressure in chamber 22 increases rapidly. As the power stream continues its movement toward the wall 48 more and more of the power stream flows into the channels 30 and 32 and less into the channel 34. The pressure in chamber 22 decreases rapidly as the pressure in channels 30 and 32 increase. The pressure chamber 20 may be transmitted to the output device 52 to indicate that the pulse generator is again in its reset state. This completes one cycle of operation of the pulse generator.

If the pressure applied to chamber 26 by the delay control means 64 had been some value greater than that assumed for the preceding description then the critical pressure in chamber 26 would have been reached at some earlier time T1' thus causing the pulse generator to begin the reset operation at an earlier time. On the other hand, if the pressure applied to chamber 26 by the delay control means had been less than that previously assumed then the pressure in chamber 26 would not have reached the critical limit until a subsequent time interval T1". In this case the pulse generator would not have begun the reset portion of the cycle until time T1".

From the above description it is seen that the pulse generator shown in FIGURE 1 has a stable reset state represented by a high pressure output signal from chamber 20 and an unstable set state represented by a high pressure output signal from chamber 24. Furthermore, the chamber 22 produces an output pressure pulse each time the pulse generator moves from its reset state to its set state or from its set state to its reset state. Delay control means 68 applies fluid to the chamber 26 to determine the length of time the pulse generator remains in its unstable set state.

Furthermore, the amount of fluid supplied to or removed from chambers 26 through pipe 64 determines the duration of time which must elapse between consecutive signals applied to channel 14 if these signals are to cause a complete pulse generator cycle. Referring to FIGURE 6, this time is measured from T0, the time the first signal is applied to channel 14 to switch the power stream to wall 50, to T1, the time at which the feedback fluid passing through orifice 66 switches the power stream back to wall 48. Any signals applied to channel 14 between T0 and T1 will have no effect on the operation of the pulse generator.

Figure 3:
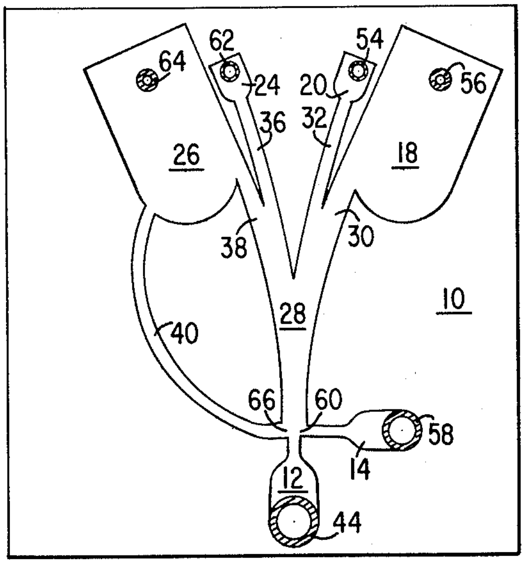
FIGURES 3 and 4 show modifications of the pulse generator shown in FIGURE 1 which produce no output pulse as the power stream switches from one state to the other.

The pulse generator shown in FIGURE 1 may be modified in various ways depending upon its intended use. For example, in some applications it may be unnecessary or even undesirable to produce a short output pulse of predetermined duration each time the generator switches from one state to the other. In this case the pulse generator is not provided with a channel 34 in chamber 22. This embodiment is shown in FIGURE 3 where the elements corresponding to the elements of FIGURE 1 have been assigned like reference numerals.

In this embodiment a relatively high pressure in chamber 20 indicates that the pulse generator is in the reset state while a relatively high pressure in chamber 24 indicates that the pulse generator is in the set state. Since this embodiment is not provided with the channel 34 as shown in FIGURE 1 it does not produce an output pulse of predetermined duration each time it changes from one state to the other.

Figure 4:
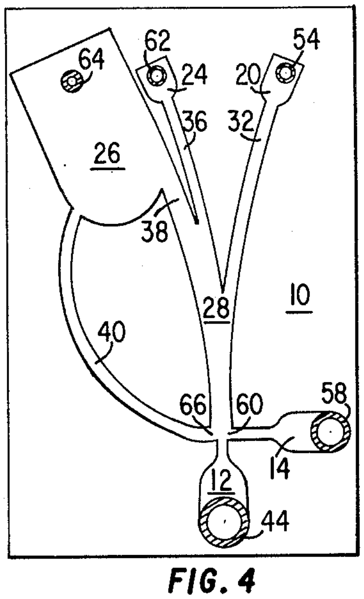

In some applications it is not necessary to provide the channel 30 and chamber 18. This embodiment is shown in FIGURE 4. In the pulse generator shown in FIGURE 4 the entire power stream flows into channel 32 and from there into chamber 20 while the pulse generator is in its reset state. With this modification an output signal of greater magnitude may be obtained from chamber 20 than is the case with the embodiment shown in FIGURES 1 and 3. Otherwise, the pulse generator shown in FIGURE 4 functions in the same manner as the one shown in FIGURE 3. If desired, a channel 34 in chamber 22 as shown in FIGURE 1 may be added to this embodiment so that short pressure pulses of predetermined duration are produced each time the pulse generator switches from one state to the other.

Figure 5:
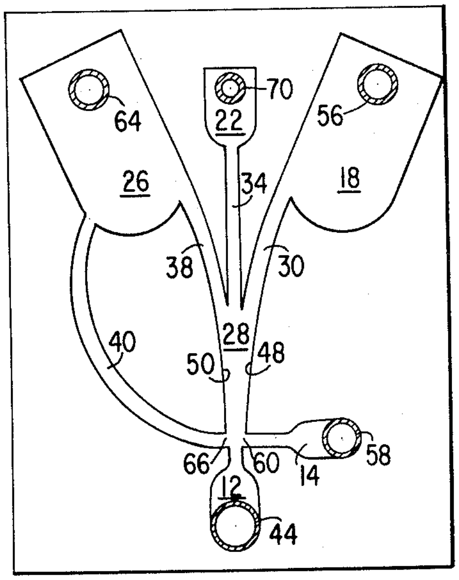
FIGURE 5 is a modification of the pulse generator shown in FIGURE 1 which has no means for producing output signals indicating the state of the pulse generator.

In other applications of the present invention it may not be necessary to have the pulse generator produce output signals indicating whether it is in the set or the reset state. This embodiment is shown in FIGURE 5 where the channels 32 and 36 in chambers 20 and 24 are omitted. In this embodiment the power stream flows through channel 30 into chamber 18 when the pulse generator is in its reset state. Upon application of a control signal to channel 14 the power stream breaks away from wall 48 and begins to move toward wall 50 and in doing so induces a short pulse of predetermined duration in the channel 34. This pressure pulse is conveyed to chamber 22 and from there through a pipe 70 to an output device.

When the pressure in chamber 26 increases sufficiently the fluid flow through orifice 66 causes the power stream to break away from wall 50 and begin swinging back toward wall 48. At approximately the midpoint of this swing another pressure pulse is induced in the channel 34.

While specific embodiments of the invention have been described with some degree of particularity, obvious modifications and substitutions therein falling within the spirit and scope of the invention will become obvious to those skilled in the art. For example, the pulse generator has been described as having a restricted opening 46. This opening may be unrestricted if a sufficient volume of fluid is supplied to channel 12 to create a high velocity power jet stream. Thus, the term orifice as used herein includes both restricted and unrestricted openings. It is intended therefore to be limited only by the scope of the appended claims.

I claim:

1. A monostable pulse generator comprising a substantially solid body, said body having formed therein a plurality of channels and chambers including an interaction chamber, a power stream input channel terminating at an orifice in said interaction chamber, a first output channel connected to said interaction chamber for normally receiving a power stream emerging from said power stream orifice, input terminal means for receiving external control signals, a control signal input channel connected at one end to said input terminal means and terminating at the other end at an orifice in said interaction chamber, said orifices being positioned such that fluid flow through said control signal orifice deflects a power stream away from said first output channel, a second output channel for receiving a power stream deflected by fluid flow through said control signal orifice, a control chamber connected to said second output channel, and a feedback channel connected to said control chamber and terminating at an orifice opposite said control signal orifice whereby a predetermined fluid flow through said feedback orifice deflects said power stream back to its normal path of flow, and means for selectively adding or removing fluid from said control chamber to thereby control the length of time a power stream flows into said second output channel.

2. A monostable pulse generator as claimed in claim 1 and further comprising a third output channel connected to said interaction chamber in a region between said first and second output channels whereby fluid flows into said third output channel for a predetermined time as said power stream is deflected from said first to said second or from said second to said first output channel.

3. A monostable pulse generator as claimed in claim 1 wherein said interaction chamber has two walls offset from the edge of said power stream orifice whereby a power stream entering said chamber flows along one or the other of said walls, said control and feedback channel orifices being located one in each of said walls.

4. The combination as claimed in claim 3 and further comprising third and fourth output channels connected to said first and second output channels, respectively, for receiving portions of a power stream flowing into said first and second output channels, means for applying a power stream to said power stream input channel, a signal source for intermittently applying fluid signals to said input terminal means, and means connected to said third and fourth output channels for indicating whether said power stream is flowing into said first or second output channel.

5. A monostable pulse generator as claimed in claim 2 wherein said interaction chamber has two walls offset from the edge of said power stream orifice whereby a power stream entering said chamber flows along one or the other of said walls, said control and feedback channel orifices being located one in each of said walls.

6. The combination as claimed in claim 5 and further comprising fourth and fifth output channels connected to said first and second output channels, respectively, for receiving portions of a power stream flowing into said first and second output channels, means for applying a power stream to said power stream input channel, a signal source for intermittently applying fluid signals to said input terminal means, and means connected to said fourth and fifth output channels for indicating whether said power stream is flowing into said first or second output channel.

7. The combination comprising: means for intermittently producing fluid signals, and pulse generator means responsive to each of said fluid signals for immediately producing a first fluid output pulse and, after a predetermined delay, producing a second fluid output pulse, said pulse generator means including an interaction chamber having a wall configuration whereby a power jet stream entering said interaction chamber assumes a first or a second path of flow, a power stream input channel terminating at an orifice in said interaction chamber for creating a power jet stream therein, first and second output channels connected to said interaction chamber for receiving a power jet stream moving along said first or said second path of flow, respectively, a control signal input channel connected to said means for intermittently producing fluid signals, said control signal input channel terminating at an orifice in said interaction chamber whereby said fluid signals issue from said orifice to cause a power stream entering said interaction chamber to assume said second path of flow, a feedback channel connected to said second output channel and terminating at an orifice in said interaction chamber for injecting fluid into said chamber at a rate dependent upon the pressure in said second output channel, said fluid being sufficient to cause a power stream entering said interaction chamber to assume said first path of flow when said pressure reaches a predetermined value, means for controlling the pressure in said second output channel to thereby determine the length of time said power stream flows along said second path of flow, and a pulse output channel connected to said chamber between said first and second paths of flow whereby an output pulse is produced in said pulse output channel each time said power stream changes its path of flow, said means for intermittently producing fluid signals being external to said pulse generator.

8. The combination as claimed in claim 7 and further comprising means for indicating whether a power stream flowing through said chamber is flowing along said first or second path of flow, said indicating means including a further channel connected to said second output channel for receiving a portion of a power stream flowing therethrough.

9. The combination as claimed in claim 8 and further comprising means for applying a power stream to said power stream input channel.

10. The combination as claimed in claim 7 wherein said means for controlling the pressure in said second output channel includes means for selectively adding fluid to said second output channel.

11. The combination as claimed in claim 1 wherein said means for controlling the pressure in said second output channel includes means for selectively removing fluid from said second output channel.

12. The combination comprising: a fluid amplifier having an interaction chamber, means for injecting a power jet stream into said chamber, said chamber having first and second walls having a configuration whereby said power jet stream has a first stable state manifested by flow along said first wall and a second stable state manifested by flow along said second wall, first and second channels connected to said chamber for receiving said power jet stream when it is in said first and second stable state, respectively, and a control signal input channel terminating at an orifice in said first wall; means external to said amplifier for applying a fluid signal to said control signal input channel irrespective of the state of said power stream to cause said power stream to flow in said second state; means for controlling the interval of time said power stream can maintain said second stable state without returning to said first stable state, said control means including a feedback channel terminating at an orifice in said second wall, a control chamber interconnecting said second channel and said feedback channel, and means for controlling the pressure in said control chamber; and an output channel connected to said interaction chamber between said first and second channels whereby a pulse of predetermined duration is produced in said output channel each time said power stream switches from one stable state to the other.

13. A pulse generator as claimed in claim 12 wherein said means for controlling the pressure in said control chamber includes means for removing from said control chamber a portion of the power jet stream entering therein from said second channel.

14. A pulse generator as claimed in claim 12 wherein said means for controlling the pressure in said control chamber includes means for adding additional fluid to the fluid of said power jet stream in said control chamber.

15. A pulse generator as claimed in claim 13 and further comprising means responsive to flow of said power stream into said first or second channel for producing fluid output signals representing the state of flow of said power stream.

16. A pulse generator as claimed in claim 14 and further comprising means responsive to flow of said power stream into said first or second channel for producing fluid output signals representing the state of flow of said power stream.

17. A pulse generator device responsive to fluid input signals for producing fluid output signals of predetermined duration, said device comprising: a fluid amplifier of the type having a first stable state manifested by flow of a power stream into a first output channel and a second stable state manifested by flow of said power stream into a second output channel; control jet means responsive to fluid input signals for directing said power stream into said second output channel; feedback means responsive to power stream flow into said second channel for issuing a fluid feedback jet of increasing magnitude, said jet increasing to a magnitude sufficient to direct said power stream into said first output channel; means for issuing a power stream between said feedback jet and said control jet; means external to and operative independently of the state of said fluid amplifier for applying fluid input signals to said control jet means; means connected to one of said output channels for producing output signals; and means for controlling the rate of increase in magnitude of said fluid jet, said control means comprising means connected to said feedback means for controlling the pressure in said feedback means.

18. A monostable device as claimed in claim 17 wherein said control means includes means for injecting fluid into said feedback means as said power stream enters said path whereby the magnitude of said feedback jet and the duration of said output signals are determined by the rate of fluid injection and by power stream flow into said feedback means.

19. A monostable device as claimed in claim 17 wherein said control means includes means for removing fluid from said feedback means as said power stream enters said path whereby the magnitude of said feedback jet and the duration of said output signals are determined by the rate of fluid withdrawal and by power stream flow into said feedback means.

References Cited by the Examiner

UNITED STATES PATENTS

| | | | |
|---|---|---|---|
| 3,001,539 | 9/61 | Hurvitz | 137—83 |
| 3,024,805 | 3/62 | Horton | 137—610 XR |

LAVERNE D. GEIGER, *Primary Examiner.*

ISADOR WEIL, *Examiner.*

UNITED STATES PATENT OFFICE
CERTIFICATE OF CORRECTION

Patent No. 3,159,169 December 1, 1964

Trevor Drake Reader

It is hereby certified that error appears in the above numbered patent requiring correction and that the said Letters Patent should read as corrected below.

Column 9, line 37, for the claim reference numeral "1" read -- 7 --.

Signed and sealed this 3rd day of May 1966.

(SEAL)
Attest:

ERNEST W. SWIDER
Attesting Officer

EDWARD J. BRENNER
Commissioner of Patents